United States Patent Office 3,024,613
Patented Mar. 13, 1962

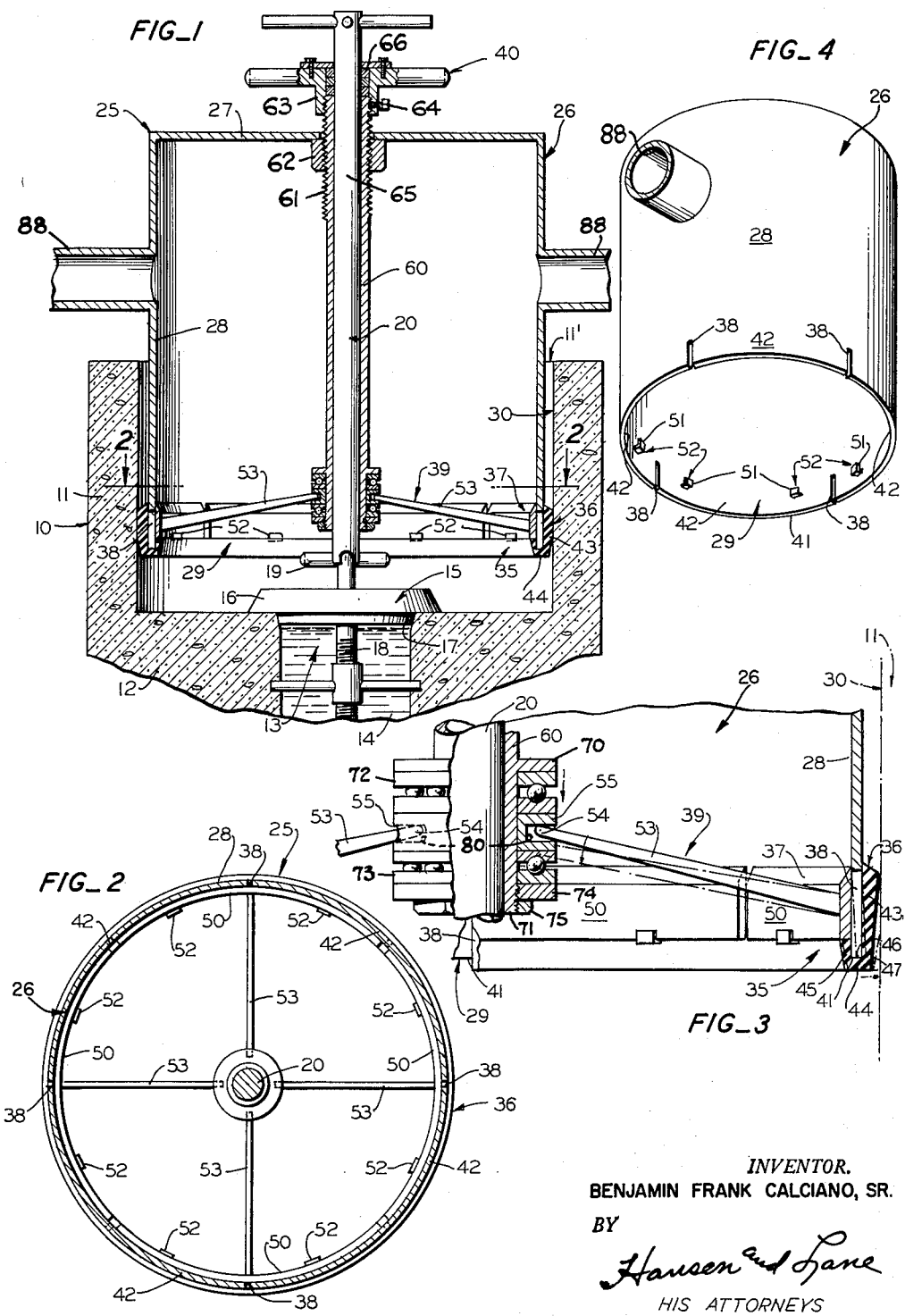

3,024,613
FLOW REGULATOR FOR IRRIGATION
STANDPIPE
Benjamin Frank Calciano, Sr., Arvin, Calif., assignor to
Cal-Hydrant Corporation, Lamont, Calif.
Filed Oct. 27, 1958, Ser. No. 769,845
7 Claims. (Cl. 61—12)

This invention relates to irrigation flow regulating apparatus and more particularly to a novel arrangement for capping an irrigation standpipe for controlling the flow of water therefrom.

The present invention is particularly designed for use in connection with round throated irrigation standpipes. These standpipes rise up out of the ground as terminal ends of a source of supply of irrigation water and are normally provided with a valve at their base by which to regulate the flow of water from such source of supply into the standpipe.

Normally, as the water rises up in the standpipe and eventually overflows from the top rim thereof it flows into irrigation ditches or flumes for transmission to row crops and the like. From this it will be appreciated that much of the water is wasted by reason of its loss at and around the standpipe. Moreover, flooding occurs around the standpipe and the earth thereabout becomes muddy and soggy making it difficult for workmen to carry out their tasks particularly in getting to and adjusting the valve by which the flow of water is regulated.

The present invention contemplates the provision of a new means for capping and controlling the flow of water from the standpipe to thereby minimize the loss of water around the standpipe and ultimate flooding of the area surrounding the standpipe. This broad general idea is disclosed in United States Letters Patent No. 2,465,975 which issued on March 29, 1949 to J. R. L. Erickson.

The present invention is directed to a novel arrangement for capping the standpipe and the provision of a novel seal and apparatus for affecting the same.

It is another object of this invention to provide a simple yet effective structure for capping an irrigation standpipe and for sealing the same for regulated flow. This object contemplates the provision of an inverted hood or pot adapted to slip fit relative to the internal walls of the standpipe and a novel means for expanding the hood or pot into water sealing engagement with the inner wall of the standpipe. The foregoing arrangement is particularly suited for use and operation in combination with the key by which the flow valve in the standpipe is regulated.

These and other objects and advantages will become apparent from a reading of the following description in the light of the drawing in which:

FIG. 1 is a vertical cross section through a conventional standpipe and valve therefor having the device of the present invention associated therewith.

FIG. 2 is a horizontal section through a portion of the present invention only of FIG. 1 and taken substantially along line 2—2 thereof.

FIG. 3 is an enlarged fragmentary detail of a portion of the device shown in FIG. 1.

FIG. 4 is a perspective view of an inverted hood or pot embodied in the present invention.

In FIG. 1 there is shown a conventional concrete standpipe 10 consisting of a cylindrical wall 11 formed monolythically with a base foundation 12 over the discharge end 13 of an underground pipeline 14 coming from a source of water supply. The standpipe 10 stands erect, open end up above the surface of the earth so that water rising out of the standpipe would normally overflow therefrom for direction along irrigation ditches or flumes toward field or row crops and/or trees for irrigating the same.

The conventional standpipe is provided with a valve 15 at the discharge end 13 of the source of water supply. This valve 15 is usually a screw actuated valve head 16 adapted to be pressed down upon a valve seat 17 formed at the mouth of the discharge opening 13. The valve head 16 is carried by a screw shaft 18 having a hand lever 19 at its upper end adapted to receive a key 20 by which the screw shaft 18 can be turned to close and/or open the valve 15.

The present invention is embodied in a flow control means 25 for capping the open upper end 11′ of the standpipe 10 and for controlling the flow of water therefrom when the valve 15 is open. The flow control means 25 comprises a pot-like hood 26 having a galvanized iron or sheet metal cylindrical wall 28 of a diameter adapted to slip fit relative to the cylindrical wall 11 of the standpipe 10. One end of the cylindrical wall 28 is closed by an integral panel 27. The hood 26 is inverted, panel end 27 up so that the open end 29 of the hood when downwardly disposed slides into the standpipe, there being sufficient clearance between the inner face 30 of wall 11 and the cylindrical wall 28 to permit ease of assembly.

In accordance with the present invention means 35 for perfecting a seal between the standpipe 10 and the open end 29 of the hood 26 is provided. The sealing means 35 comprises in combination a gasket 36 between the cylindrical wall 28 of the hood and the cylindrical wall 11 of the standpipe and means 37 for expanding the relatively flexible or resilient cylindrical wall 28 in the region of the gasket 36 for effecting a water seal between the latter and the inner face of the cylindrical wall 11 of the standpipe.

The means 37 includes the provision of a plurality of vertically extending slits 38 in the cylindrical wall 28 of the hood and expandable means 39 including a hand operated lever 40 exteriorly of the hood for effecting outward radially directed internal pressure against the slitted area of the cylindrical wall 28 for expanding the same.

More specifically the slits 38 are preferably formed at the open end 29 of the cylindrical wall 28 from the outer edge 41 thereof into the body of the wall 28. These slits 38 may vary in number and for purposes of illustration I have shown a minimum number of four at quadrantal positions on the cylindrical wall 28 (see FIGS. 2 and 4). This leaves segments 42 between the slits 38 which segments are adapted to bow outwardly when internal pressure is applied to them in a manner to be explained.

The gasket 36 is preferably a molded rubber unit of annular shape having a main outer portion 43 adapted to have stretch fit around the cylindrical wall 28 as best seen in FIG. 3. The gasket 36 further includes an integral base rim 44 adapted to overlay the outer edge 41 of the cylindrical wall 28 and an inner flange 45 spaced from the main outer portion 43 and forming therewith an annular groove 46 adapted to receive the open end 29 of the cylindrical wall 28.

As best illustrated in FIG. 3 the main outer portion 43 of the gasket is dimensioned to cover the slits 38 to effect a water seal relative thereto and to be stretched radially outward by the segments 42 of the cylindrical wall 28 when they are expanded from within the hood. Note in FIG. 3 that the outer surface of the main portion 43 of gasket 36 is tapered as at 47, the broadest dimension thereof being opposite the base of the slits 38 and approximately comparable to the clearance space between the cylindrical wall 28 and the inner surface 30 of the cylindrical wall 11 of the standpipe 10. The taper 47 is narrowest adjacent the base rim 44 of the gasket to thereby afford ease of movement of the hood into place within the cylindrical wall 11 of the standpipe when the hood is being mounted therein.

The inner flange 45 of the gasket 36 extends upwardly but slightly within the cylindrical wall 28 to accommodate a shoe 50 formed as a part of the expandable means 39. The shoes 50 are preferably equal in number to the slits 38 and segments 42 and each consist of a rigid band of arcuate shape conforming to the inner face of the cylindrical wall 28. These shoes 50 preferably extend equal distances to either side of a slit 28 so as to exert pressure against equal portions of adjoining segments 42 at the open end 29 of the cylindrical wall 28.

Means for supporting the shoes 50 in juxtaposition to the segments 42 as aforesaid comprises a number of inwardly extending ledges 51 each formed as a part of metal clips 52 welded or otherwise secured to the inner surface of the cylindrical wall 28. In addition thereto each shoe 50 is secured to one end of an arm 53 the opposite end 54 of which rests in an annular collar 55 supported centrally of the hood 26. As best seen in FIG. 2 the arms 53 are secured centrally of each shoe 50 and extend radially toward the center of the hood for engagement with the collar 55 disposed there.

The collar 55 is mounted upon the lower end of a sleeve shaft 60. This sleeve shaft 60 is suspended from the panel 27 of the hood 26 concentrically of the latter. The sleeve shaft 60 is a component of the expandable means 39 and to this end is movable co-axially of the hood 26. For this reason the upper end 61 of the sleeve shaft 60 is threaded to fit through a threaded boss 62 secured to the panel 27 co-axially of the cylindrical wall 28 of the hood. The hand operated lever 40 previously mentioned is secured to the upper end 61 of the sleeve exteriorly of the hood for turning the sleeve shaft relative thereto.

The hand operated lever 40 is in the form of a wheel having a hub portion 63 thread to the upper end of the sleeve shaft 60 and secured thereto by a set screw 64. The key 20 by which the valve 15 is operated consists of a shaft 65 which extends upwardly from the valve handle 19 through the center of the sleeve shaft 60. The shaft 65 of the key 20 extends up through the hub 63 of the wheel 40 and is embraced by a seal provided by a packing gland 66 formed in the hub 63 in a well known manner. Thus it will be seen that although the lower end of the sleeve shaft 60 is exposed to water under pressure any leakage up through sleeve shaft 60 will be sealed by the packing gland 66.

The lower end of the sleeve shaft 60 is detailed in FIG. 3 which illustrates rather clearly the basic features and operation of the expandable means 39. Note in particular that the arms 53 extending radially inward toward the collar 55, are disposed at a slight upward pitch toward an imaginary apex at center of the hood or sleeve shaft therein. The collar 55 is free to rotate relative to the sleeve shaft 60 but is held against movement lengthwise thereof. To this end the sleeve shaft 60 has a flange 70 formed thereon at a distance from the free lower end 71 of the shaft 60 to receive the collar 55, a pair of thrust bearings 72 and 73 as well as a lower flange 74 and lock nut and washer 75.

As best seen in FIG. 3 the collar is sandwiched between the two thrust bearings 72 and 73 which assembly is sandwiched between the fixed flange 70 and the removable lower flange 74. The lower flange 74 is threadedly mounted on the lower end 71 of the sleeve shaft 60 and is locked in place by the lock washer and the nut 75 which is also threaded to the sleeve shaft 60.

The collar 55 has recesses 80 at radial positions about its periphery to receive and support the inner, free end 54 of the respective arms 53 of the pressure exerting means 39. As previously stated the arms 53 are pitched relative to horizontal, inclining from the perimeter of the hood 26 toward the center thereof. Therefore, when the hand wheel 40 is turned to screw the sleeve shaft 60 downwardly relative to the boss 62 fixed to the panel 27, the fixed upper flange 70 on the sleeve shaft 60 of thereby pressed downwardly against the thrust bearing 72. The bearing 72 likewise presses down upon the collar 55 to thereby exert a downward force against the free end 54 of each of the arms 53. In this manner each of the arms 53 acts as struts and are pressed radially outward as well to thereby cause the shoes 50 at the ends of the arms to spread outwardly relative to the normal circumference of the inner side of the cylindrical wall 28. This exerts an outward pressure against the segments 42 between the slits in the wall 28 to expand the latter. Thus it will be seen that the rubber gasket 36 is pressed firmly against the inner face 30 of the cylindrical wall 11 of the standpipe 10 to bindingly engage the same and to provide a water tight seal relative thereto.

Now, when the water is released from the pipe 14 by opening of valve 15 the interior of the hood 26 will be filled with water for ultimate discharge via radial throats 88 formed as a part of the hood 26. These throats 88 are adapted to be connected to flume or irrigation pipe (not shown) to transmit the water to areas where it is to be used.

While I have described the device of the drawings in specific detail it will be appreciated that it is susceptible to variations, alterations and/or modifications without departing from the spirit of my invention. I therefore desire to avail myself of all variations, alterations and/or modifications as fairly come within the purview of the appended claims.

What I claim as new and desire to protect by Letters Patent is:

1. The combination with a flow regulator for an irrigation standpipe of an inverted cap-like hood having a flexible cylindrical wall diametered for slip fit open end down into said standpipe, a plurality of vertical slits formed in said cylindrical wall at a common horizontal plane, a gasket circumscribing said cylindrical wall and covering said slits, expandable means supported internally of said cap-like hood including expanding means engaging the inner face of said cylindrical wall in the region of said slits, and hand operated means exteriorly of said hood operatively connected to said expanding means interiorly of said hood for manually expanding the same to compress said gasket between said cylindrical wall and the inner face of said standpipe for effecting a water tight seal therebetween and for securing said hood to said standpipe.

2. The combination with a flow regulator for an irrigation standpipe of means for effecting a water tight seal and securing said flow regulator to said standpipe comprising a hood of flexible material for capping said standpipe including a cylindrical wall diametered for slip fit open end down into the open upper end of said standpipe, said cylindrical wall having a plurailty of vertical slits formed therein at equal distances from each other to provide a plurality of wall segments circumferentially of said cylindrical wall, a gasket circumscribing said cylindrical wall and covering said slits formed therein, and expandable means for exerting outward radial pressure against said wall segments relative to said slits for compressing said gasket between said segments and the inner face of said standpipe.

3. The combination with an irrigation standpipe of the type including a cylinder having its base communicating with the discharge end of an irrigation supply line and a screw operated valve for opening and closing said discharge end of said supply line for regulating the flow of water therefrom; of a flow regulator comprising a cap-like hood having a flexible cylindrical wall diametered for slip fit open end down into said cylinder of the standpipe, a plurality of slits formed in said cylindrical wall to provide expandable segments between said slits, an expandable gasket circumscribing said cylindrical wall for covering said slits, expandable means internally of said hood for exerting outward radial pressure against said expandable segments for compressing said gasket between the latter and the inner face of said cylinder, and a hand operated lever exteriorly of said hood operatively connected to said expandable means within said hood for effecting movement of the pressure exerting toward and from said expandable segments.

4. For use on an irrigation standpipe having an upstanding cylinder integral with a base formed around the discharge end of an irrigation supply line and a screw operated valve at the discharge end of said supply line for regulating the flow of water therefrom; a flow regulator comprising an inverted pot-like hood having a flexible cylindrical wall diametered for slip fit into said cylinder of the standpipe open end down and a panel closing the opposite upper end of said cylindrical wall, a plurality of vertically extending slits formed in said cylindrical wall adjacent the open end thereof to provide expandable segments therein, a gasket overlying said segments and the slits formed therebetween, a plurality of pressure exerting shoes inside said hood for circumferentially engaging the inner faces of said expandable segments, an arm extending radially inward from each said shoe, a collar co-axially of said hood having recesses formed therein for receiving and supporting the inner end of each of said arms, a sleeve shaft supporting said collar for up and down movement therewith, said sleeve shaft having threaded connection with said panel at the upper end of said cylindrical wall, and means exteriorly of said hood for turning said sleeve shaft for raising and lowering the same relative to said hood.

5. For use on an irrigation standpipe having an upstanding cylinder integral with a base formed around the discharge end of an irrigation supply line and a screw operated valve at the discharge end of said supply line for regulating the flow of water therefrom; a flow regulator comprising an inverted pot-like hood having a flexible cylindrical wall dimensioned to have slip fit into said cylinder open end down and having a panel closing the opposite upper end thereof, a plurality of vertically extending slits formed in said cylindrical wall adjacent the open end thereof to provide expandable segments therein, a gasket overlying said segments and the slits formed therebetween, and means for exerting internal pressure against said segments for pressing said gasket firmly against said cylinder comprising a hand operated shaft threadedly connected to said panel co-axially of said cylindrical wall for up and down movement relative thereto, a collar supported on said shaft for up and down movement therewith and rotation relative thereto, a plurality of arms extending radially from said collar and at a slight angle relative to true radius of said cylinder, and a segmental shoe on the outer end of each said arm engaging the inner face of respective segments of said cylindrical wall for expanding said segments.

6. For use on a cylindrical standpipe having an integral base formed around the discharge end of an irrigation supply line and a screw operated valve for regulating the flow of water from said supply line; a flow regulator comprising an inverted pot-like hood having a flexible cylindrical wall dimensioned to have slip fit into said standpipe open end down, a panel closing the opposite upper end of said cylindrical wall, a plurality of vertically extending slits formed in said cylindrical wall adjacent the open end thereof to provide expandable segments therein, a gasket circumscribing said cylindrical wall in the region of said segments to cover the slits formed therebetween, a key for operating said valve including a handle exteriorly of said hood and a key shaft co-axially thereof adapted for key connection to said screw operated valve, a sleeve shaft for supporting said key shaft, means for supporting said sleeve shaft for up and down movement relative to said panel, hand operated means exteriorly of said hood connected to said sleeve shaft for effecting up and down movement thereof, a collar supported on said sleeve shaft for up and down movement therewith and rotation relative thereto within said hood, a plurality of arms extending radially from said collar at an angle relative to horizontal, and a segmental shoe on the end of each said arm adapted to engage the internal faces of adjacent segments of said cylindrical wall for expanding the same to thereby compress said gasket between said cylindrical wall and said standpipe.

7. The combination with a cylindrical standpipe and the key shaft for operating the valve at the base thereof, of means for capping said standpipe to control the flow of water therefrom comprising an inverted pot-like hood having a flexible cylindrical wall dimensioned to have slip fit into said cylindrical standpipe open end down, means for effecting a water tight seal between said cylindrical wall and standpipe comprising a gasket between said cylindrical wall and the cylindrical standpipe, said cylindrical wall having a plurality of slits formed therein in the region of said gasket so as to be covered thereby, and to provide expandable segments in said cylindrical wall, and means for expanding said expandable segments comprising a plurality of rigid arcuate bands conforming to the inner face of said cylindrical wall, each said band extending equidistant to either side of a slit in said wall for exerting pressure against equal portions of adjacent segments thereof, an arm extending radially inward from said band, toward an apex co-axially of said hood, a collar concentric to said hood for receiving and supporting the inner ends of said arms, a shaft threaded through the top of said pot-like hood and extending through said collar, means on said shaft for holding said collar thereon for up and down movement therewith, and means exteriorly of said hood for turning said shaft.

References Cited in the file of this patent

UNITED STATES PATENTS

| | | |
|---|---|---|
| 79,400 | Salisbury | June 30, 1868 |
| 402,600 | Kemp | May 7, 1889 |
| 1,880,218 | Simmons | Oct. 4, 1932 |
| 2,465,975 | Erickson | Mar. 29, 1949 |
| 2,646,076 | Bonander | July 21, 1953 |
| 2,775,869 | Pointer | Jan. 1, 1957 |
| 2,821,998 | Mayhew | Feb. 4, 1958 |
| 2,881,788 | Johnson | Apr. 14, 1959 |
| 2,923,308 | Shohan | Feb. 2, 1960 |